(12) United States Patent
Ke et al.

(10) Patent No.: US 10,598,847 B2
(45) Date of Patent: Mar. 24, 2020

(54) LIGHT SOURCE MODULE AND PRISM SHEET THEREOF

(71) Applicant: NANO PRECISION TAIWAN LIMITED, Hsinchu County (TW)

(72) Inventors: Ming-Ta Ke, Hsin-Chu (TW); Chao-Hung Weng, Hsin-Chu (TW); Hao-Jan Kuo, Hsin-Chu (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 15/874,403

(22) Filed: Jan. 18, 2018

(65) Prior Publication Data

US 2018/0292598 A1 Oct. 11, 2018

(30) Foreign Application Priority Data

Apr. 11, 2017 (CN) .......................... 2017 1 0231898

(51) Int. Cl.
*G02B 6/00* (2006.01)
*F21V 8/00* (2006.01)

(52) U.S. Cl.
CPC ......... *G02B 6/0053* (2013.01); *G02B 6/0036* (2013.01); *G02B 6/0055* (2013.01)

(58) Field of Classification Search
CPC ... G02B 6/0053; G02B 6/0036; G02B 6/0055
See application file for complete search history.

(56) References Cited

U.S. PATENT DOCUMENTS

| | | | | |
|---|---|---|---|---|
| 6,151,169 A * | 11/2000 | Kim | ..................... | G02B 6/0053 349/61 |
| 7,309,153 B2 * | 12/2007 | Arihara | ................ | G02B 6/0016 349/62 |
| 7,366,392 B2 * | 4/2008 | Honma | ................ | G02B 6/0048 385/146 |
| 8,262,274 B2 * | 9/2012 | Kim | ..................... | G02B 6/0018 349/62 |
| 8,848,132 B2 * | 9/2014 | O'Neill | ................ | G02B 6/0096 349/64 |

(Continued)

FOREIGN PATENT DOCUMENTS

| | | |
|---|---|---|
| CN | 101546040 A | 9/2009 |
| CN | 101939675 A | 1/2011 |

(Continued)

*Primary Examiner* — Anabel Ton

(57) ABSTRACT

A light source module includes a light guide plate, a light source, a first prism sheet, a second prism sheet and a third prism sheet. The light guide plate includes a light emitting surface, a bottom surface and a light incident surface. The light source is disposed on the light incident surface and emits a beam into the light guide plate through the light incident surface. The first prism sheet is disposed on the light emitting surface and includes a plurality of first prism units located between the light emitting surface and the second prism sheet. The second prism sheet includes a plurality of second prism units extending in a first direction and located between the first prism sheet and the third prism sheet. The third prism sheet includes a plurality of third prism units extending in a second direction. The first direction is perpendicular to the second direction.

15 Claims, 8 Drawing Sheets

(56) References Cited

U.S. PATENT DOCUMENTS

| | | | | |
|---|---|---|---|---|
| 8,882,324 B2* | 11/2014 | Adachi | ............... | G02B 5/045 349/57 |
| 2002/0114151 A1* | 8/2002 | Lee | ............... | G02B 6/0055 362/627 |
| 2007/0058391 A1* | 3/2007 | Wilson | ............... | G02B 6/0036 362/606 |
| 2007/0274097 A1* | 11/2007 | Chen | ............... | G02B 6/0036 362/609 |
| 2008/0013341 A1 | 1/2008 | Sano et al. | | |
| 2008/0232137 A1* | 9/2008 | Fukuda | ............... | G02B 6/0036 362/620 |
| 2010/0026703 A1* | 2/2010 | Parker | ............... | G02B 6/0046 345/589 |
| 2010/0208496 A1 | 8/2010 | Kim et al. | | |
| 2011/0141765 A1 | 6/2011 | Chang et al. | | |
| 2014/0211483 A1 | 7/2014 | Cho | | |
| 2014/0355250 A1* | 12/2014 | Tyan | ............... | G02B 5/0226 362/97.1 |
| 2015/0260997 A1* | 9/2015 | Wang | ............... | G02B 27/126 359/625 |

FOREIGN PATENT DOCUMENTS

| | | |
|---|---|---|
| CN | 102901055 A | 1/2013 |
| CN | 103375741 A | 10/2013 |
| KR | 1020070075996 A | 7/2007 |
| TW | 200720588 A | 6/2007 |
| TW | 201120525 A | 6/2011 |
| TW | 201426104 A | 7/2014 |

\* cited by examiner

| The angles of $\theta 1$ and $\theta 2$ | 5 | 9 | 11 | 13 | 15 | 17 | 18 | 19 | 19.5 | Without the first prism sheet |
|---|---|---|---|---|---|---|---|---|---|---|
| Average luminance | 8559.6 (0.97) | 9855.3 (1.12) | 9868.7 (1.13) | 10300.1 (1.17) | 11439.5 (1.29) | 10895.7 (1.23) | 11130.4 (1.26) | 12278.9 (1.39) | 12525.1 (1.42) | 8837.5 (1) |

| The angles of $\theta 1$ and $\theta 2$ | 20 | 20.5 | 21 | 22 | 23 | 24 | 25 | 30 | Without the first prism sheet |
|---|---|---|---|---|---|---|---|---|---|
| Average luminance | 12484.1 (1.41) | 12534.3 (1.42) | 12560.5 (1.42) | 12352.8 (1.40) | 11323.4 (1.28) | 10808.7 (1.22) | 10294.3 (1.16) | 7687.0 (0.87) | 8837.5 (1) |

FIG. 3

| The angles of $\theta 7$ and $\theta 8$ | 85 | 86 | 87 | 88 | 89 | 90 | 91 | 92 | 93 | 94 | 95 | Without the first prism sheet |
|---|---|---|---|---|---|---|---|---|---|---|---|---|
| Average luminance | 11248.2 (1.27) | 11394.3 (1.29) | 11532.1 (1.30) | 11717.4 (1.33) | 11817.3 (1.34) | 12484.1 (1.41) | 11599.6 (1.31) | 11307.2 (1.28) | 11129.4 (1.26) | 10748.2 (1.22) | 10410.1 (1.18) | 8837.5 (1) |

| The angles of $\theta 7$ and $\theta 8$ | 80 | 81 | 82 | 87 | 88 | 89 | 90 | 91 | 92 | 93 | 94 | Without the first prism sheet |
|---|---|---|---|---|---|---|---|---|---|---|---|---|
| Average luminance | 10545.3 (1.19) | 10682.2 (1.21) | 10821.0 (1.22) | 10961.6 (1.24) | 11103.9 (1.26) | | | | | | | 8837.5 (1) |

FIG. 4

LIGHT SOURCE MODULE AND PRISM SHEET THEREOF

CROSS-REFERENCE TO RELATED APPLICATION

This application claims the priority benefit of china application (CN201710231898.7 filed on Apr. 11, 2017). The entirety of the above-mentioned patent application is hereby incorporated by reference herein and made a part of this specification.

FIELD OF THE INVENTION

The invention relates to a light source module, and more particularly to a light source module having a prism sheet.

BACKGROUND OF THE INVENTION

In the conventional display device, the backlight module generally includes a light source and a reflective sheet, a light guide plate, a lower diffusion sheet, a lower prism sheet, an upper prism sheet and an upper diffusion sheet (or a brightness enhancement film) arranged from bottom to top. The light guide plate is the main component of the backlight module to guide the beam to the display panel. When the beam emitted from the light source enters the light guide plate, the beam is transmitted toward the other end of the light guide plate by the principle of total reflection, and during the duration, the beam is only transmitted in the light guide plate and cannot be emitted from the light emitting surface of the light guide plate. In order to allow the beam to be emitted from the light emitting surface of the light guide plate, a microstructure is disposed on the bottom surface of the light guide plate. When the beam is transmitted to the bottom of the light guide plate and touches the microstructure, the beam reflected by the microstructure will diffuse at various angles, so that the total reflection condition and the interference of light are destroyed and the beam can be emitted from the light emitting surface of the light guide plate.

However, after the beam emitted from the light source enters the light guide plate and then is emitted from the light guide plate, the beam will be reflected back and forth between the prism sheet and the reflective sheet. The more the number of reflections between the prism sheet and the reflective sheet, the more the attenuation of energy of the beam, which may lead to an overall luminance decrement. Specifically, when the beam penetrates the bottom surface of the light guide plate, the reflected light reflected by the reflective sheet is transmitted back to the light guide plate and is emitted to the lower prism sheet through the light emitting surface of the light guide plate. If the angle of the reflected light cannot match the light emit angle of the lower prism sheet, the reflected light will be reflected back into the light guide plate again. If the aforementioned reflection occurs repeatedly, the loss of light energy will increase. In general, in order to increase the luminance, in addition to dispose microstructures having different densities or different shapes on the light guide plate, the number of light sources or the current of the light source can also be increased, but the enhance effect is limited and the cost maybe increased. Therefore, how to reduce the number of times that the beam is reflected back and forth between the prism sheet and the reflective sheet, thereby improving the above-mentioned problem and allowing the beam can be effectively derived from the prism sheet is the focus of attention of the relevant personnel in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An objective of the invention is to provide a light source module, in which the structural design has an effect of enhancing the luminance and adjusting the viewing angle.

An objective of the invention is to provide a prism sheet, in which the structural design has an effect of enhancing the luminance and adjusting the beam to a specific angle.

Other objectives and advantages of the invention may be further illustrated by the technical features disclosed in the invention.

In order to achieve one or a portion of or all of the objectives or other objectives, an embodiment of the invention provides a light source module, which includes a light guide plate, a light source, a first prism sheet, a second prism sheet and a third prism sheet. The light guide plate includes a light emitting surface, a bottom surface opposite to the light emitting surface and a light incident surface connected to the light emitting surface and the bottom surface. The light source is disposed on the light incident surface of the light guide plate, wherein the light source is adapted to emit a beam into the light guide plate through a transmission of the light incident surface. The first prism sheet is disposed on the light emitting surface of the light guide plate, wherein the first prism sheet includes a plurality of first prism units, and the first prism units face a direction away from the light emitting surface. The first prism sheet is located between the light emitting surface of the light guide plate and the second prism sheet, the second prism sheet includes a plurality of second prism units extending in a first direction, and the second prism units face the direction away from the light emitting surface. The second prism sheet is located between the first prism sheet and the third prism sheet, the third prism sheet includes a plurality of third prism units extending in a second direction, the third prism units face the direction away from the light emitting surface, and the second direction is perpendicular to the first direction.

In order to achieve one or a portion of or all of the objectives or other objectives, another embodiment of the invention provides a prism sheet adapted to be disposed on a light guide plate, which includes a substrate and a plurality of prism units. The substrate has a top surface facing a direction away from the light guide plate. The prism units are connected to the top surface of the substrate, wherein the prism units face the direction away from the light guide plate, each of the prism units includes a first inclined surface and a second inclined surface, the first inclined surface is adjacent to and connects with the second inclined surface, there is a first included angle between the first inclined surface and the top surface, there is a second included angle between the second inclined surface and the top surface, the first included angle is θ1, and 9°≤θ1≤25°.

In the light source module according to the embodiment of the invention, the first prism sheet, the second prism sheet, and the third prism sheet are arranged in descending order from above on the light guide plate, and the beam emitted from the light guide plate is adjusted by the first prism sheet to the specific angle and transmitted to the second prism sheet and the third prism sheet sequentially, and then the beam is adjusted to overlap with the normal line of the light emitting surface of the light guide plate by the second prism sheet and the third prism sheet. Therefore, such a design of structure can adjust the vertical viewing angle of the light source module, and further increase the amount of light, and thus improve the luminance of the light source module. In addition, the first prism sheet of the embodiment of the invention has a plurality of specially designed prism units, so that the beam emitted from the light guide plate can be adjusted to the specific angle.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view of the relation of the first included angle between the first inclined surface and the top surface and the second included angle between the second inclined surface and the top surface to the luminance;

FIG. 4 is a schematic view of the relation of the first vertex angle of each second prism unit and the second vertex angle of each third prism unit to the luminance;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
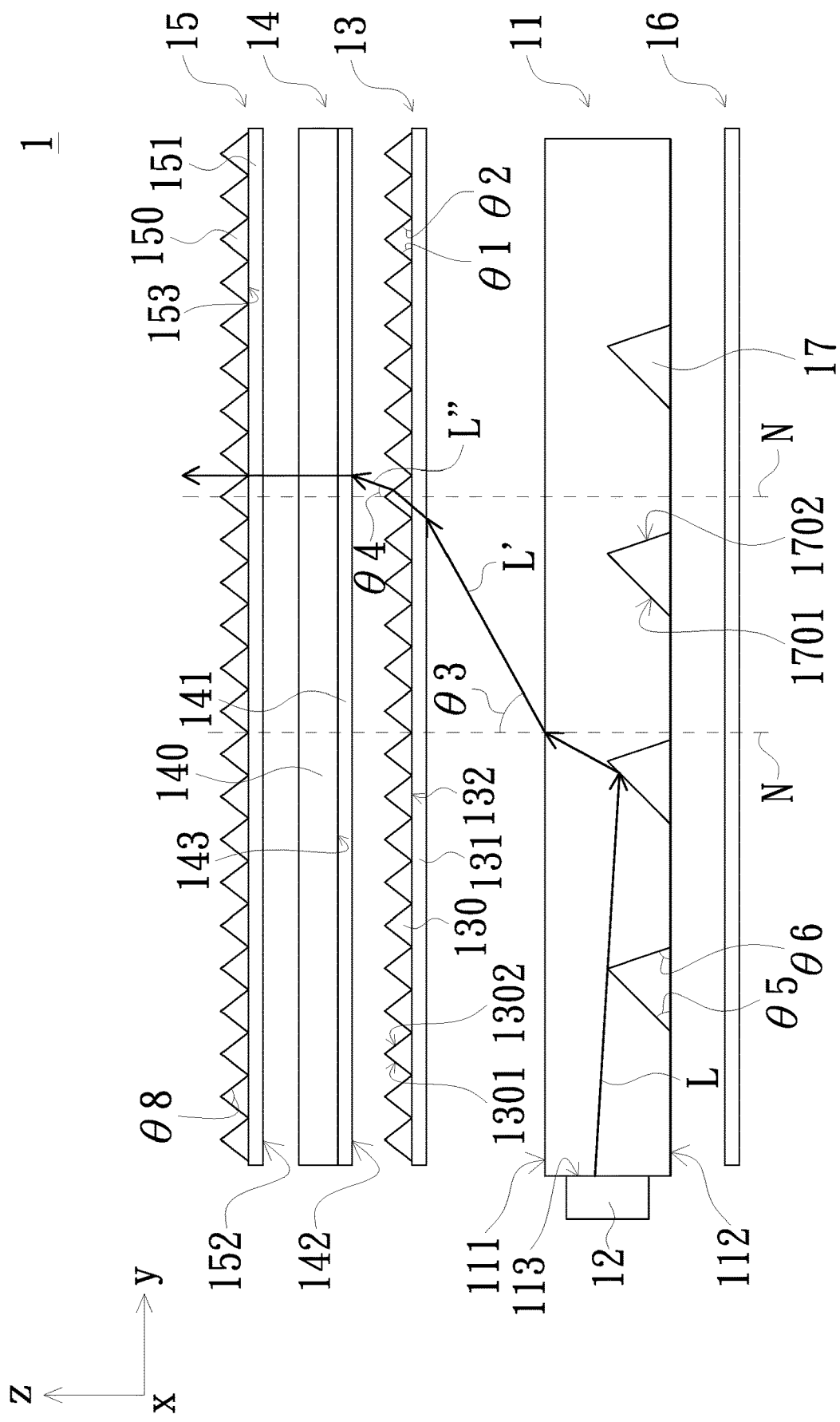
FIG. 1 is a schematic side view of a light source module according to an embodiment of the invention.
Figure 2:
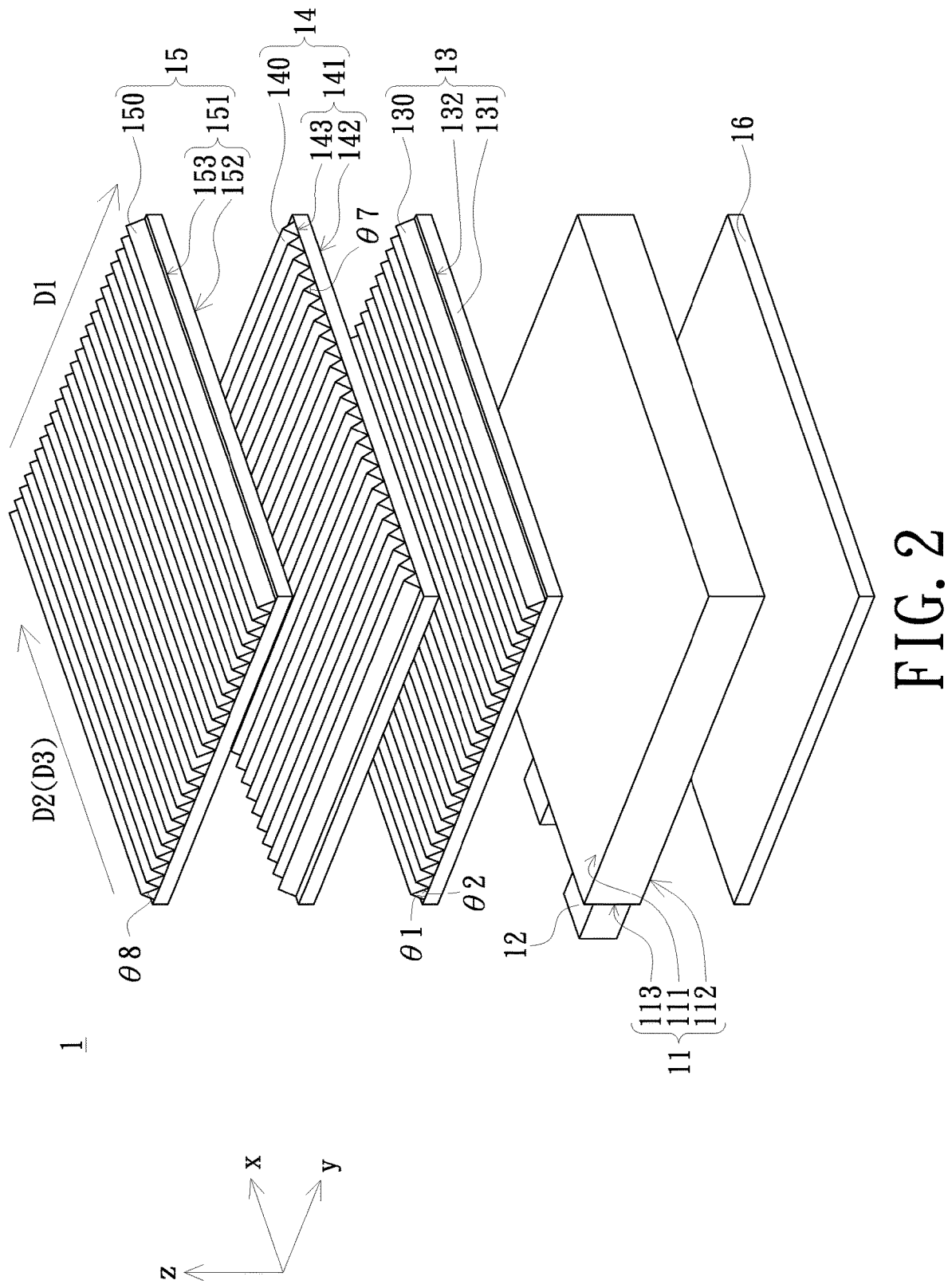
FIG. 2 is a schematic perspective structural view of the light source module of FIG. 1.

Referring to FIG. 1 and FIG. 2. FIG. 1 is a schematic side view of a light source module according to an embodiment of the invention. FIG. 2 is a schematic perspective structural view of the light source module of FIG. 1. In order to facilitate the description of the direction of each element and structure in the light source module 1, there is defined a rectangular coordinate system including mutually perpendicular x-axis, y-axis and z-axis, wherein the x-z plane is, for example, parallel to the light incident surface 113, and the x-y plane is, for example, parallel to the light emitting surface 111. As shown in FIG. 1 and FIG. 2, the light source module 1 of the embodiment includes a light guide plate 11, a light source 12, a first prism sheet 13, a second prism sheet 14 and a third prism sheet 15. The light guide plate 11 includes a light emitting surface 111, a bottom surface 112 opposite to the light emitting surface 111 and a light incident surface 113 connected to the light emitting surface 111 and the bottom surface 112. In the embodiment, the light guide plate 11 has, for example, a flat plate configuration. In other embodiments, the light guide plate 11 is, for example, wedge-shaped, and the invention does not limit the configuration of the light guide plate 11. The light source 12 is disposed on the light incident surface 113 of the light guide plate 11, and the light source 12 is adapted to emit a beam L to the light incident surface 113 of the light guide plate 11, wherein the beam L is then transmitted into the light guide plate 11. In the embodiment, the light source 12 is, for example, a light-emitting diode (LED), and a plurality of light sources 12 are arranged along the x-axis direction, to which the invention is not limited. The light source 12 may be a cold cathode fluorescent lamp (CCFL). The first prism sheet 13 is disposed on the light emitting surface 111 of the light guide plate 11, and the first prism sheet 13 is located between the light emitting surface 111 of the light guide plate 11 and the second prism sheet 14. The first prism sheet 13 includes a plurality of first prism units 130, and the first prism units 130 face the direction away from the light emitting surface 111 of the light guide plate 11. The second prism sheet 14 is disposed between the first prism sheet 13 and the third prism sheet 15, and the second prism sheet 14 includes a plurality of second prism units 140 extending in a first direction D1 (i.e., the y-axis direction). The second prism units 140 face the direction away from the light emitting surface 111 of the light guide plate 11. The third prism sheet 15 includes a plurality of third prism units 150 extending in a second direction D2 (i.e., the x-axis direction). The third prism units 150 face the direction away from the light emitting surface 111 of the light guide plate 11, and the second direction D2 in which the third prism units 150 extend is perpendicular to the first direction D1 in which the second prism units 140 extend.

The detailed structure of the light source module 1 according to the embodiment will be described in the following descriptions.

As shown in FIG. 1 and FIG. 2, the first prism sheet 13 of the embodiment further includes a first substrate 131, and the first substrate 131 has a top surface 132 facing the second prism sheet 14. The first prism units 130 are connected to the top surface 132 of the first substrate 131, and the first prism units 130 extend in a third direction (i.e., the x-axis direction) respectively. In the embodiment, the third direction D3 in which the first prism units 130 extend is, for example, the same as the second direction D2 in which the third prism units 150 extend, and the second direction D2 and the third direction D3 are parallel to the light incident surface 113 of the light guide plate 11 respectively. In addition, each of the first prism units 130 of the embodiment includes a first inclined surface 1301 close to the light source 12 and a second inclined surface 1302 away from the light source 12. The first inclined surface 1301 is adjacent to and connects with the second inclined surface 1302, there is a first included angle θ1 between the first inclined surface 1301 and the top surface 132, and there is a second included angle θ2 between the second inclined surface 1302 and the top surface 132. In the embodiment, the first included angle θ1 is, for example, greater than or equal to 9 degrees and less than or equal to 25 degrees, and the second included angle θ2 is, for example, greater than or equal to 9 degrees and less than or equal to 25 degrees. Specifically, the first inclined surface 1301, the second inclined surface 1302 and the top surface 132 of the first substrate 131 form a symmetrical or asymmetrical triangle. Under the design that the first included angle θ1 and the second included angle θ2 are greater than or equal to 9 degrees and less than or equal to 25 degrees respectively, the shape formed by the first inclined surface 1301, the second inclined surface 1302 and the top surface 132 of the first substrate 131 is, for example, an isosceles triangle or an asymmetric triangle having different base angles. Therefore, the vertex angle (not shown in the figures) of the triangle is, for example, greater than or equal to 130 degrees and less than or equal to 162 degrees.

As shown in FIG. 1 and FIG. 2, the second prism sheet 14 of the embodiment further includes a second substrate 141. The second substrate 141 has a first surface 142 and a second surface 143 opposite to the first surface 142. The first surface 142 is opposite to (faces) the top surface 132 of the first substrate 131 of the first prism sheet 13, and the second prism units 140 of the second prism sheet 14 are disposed on the second surface 143 of the second substrate 141. Specifically, the second prism units 140 are arranged along the x-axis direction and connected to the second surface 143 of the second substrate 141, and the first direction D1 in which the second prism units 140 extend is perpendicular to the light incident surface 113 of the light guide plate 11.

As shown in FIG. 1 and FIG. 2, the third prism sheet 15 of the embodiment further includes a third substrate 151. The third substrate 151 has a third surface 152 and a fourth surface 153 opposite to the third surface 152. The third surface 152 is opposite to (faces) the second surface 143 of the second substrate 141 of the second prism sheet 14, and the third prism units 150 of the third prism sheet 15 are disposed on the fourth surface 153 of the third substrate 151. Specifically, the third prism units 150 are arranged along the y-axis direction and connected to the fourth surface 153 of the third substrate 151.

As shown in FIG. 1 and FIG. 2, the light source module 1 of the embodiment further includes a reflective sheet 16, and the light guide plate 11 further includes a plurality of first microstructures 17. The reflective sheet 16 is disposed on the bottom surface 112 of the light guide plate 11, and the light guide plate 11 is located between the reflective sheet 16 and the first prism sheet 13. The first microstructures 17 are disposed on the bottom surface 112 of the light guide plate 11. Specifically, in the embodiment, the first microstructures 17 are, for example, recessed into the bottom surface 112 of the light guide plate 11 in the direction toward the light emitting surface 111, to which the invention is not limited. In other embodiments, the first microstructures 17 protrude, for example, from the bottom surface 112 of the light guide plate 11 in the direction toward the reflective sheet 16. The first microstructures 17 of the embodiment are recessed into the bottom surface 112 of the light guide plate 11 in the direction toward the light emitting surface 111. Each of the first microstructures 17 includes a third inclined surface 1701 close to the light source 12 and a fourth inclined surface 1702 away from the light source 12. The third inclined surface 1701 is adjacent to and connects with the fourth inclined surface 1702. There is a fifth included angle θ5 between the third inclined surface 1701 and the bottom surface 112 of the light guide plate 11, there is a sixth included angle θ6 between the fourth inclined surface 1702 and the bottom surface 112 of the light guide plate 11, and the fifth included angle θ5 is smaller than the sixth included angle θ6. In addition, in the embodiments that the first microstructures 17 protrude from the bottom surface 112 of the light guide plate 11 in the direction toward the reflective sheet 16 (not shown in the figures), each of the first microstructures 17 includes a fourth inclined surface 1702 close to the light source 12 and a third inclined surface 1701 away from the light source 12. The third inclined surface 1701 is adjacent to and connects with the fourth inclined surface 1702. There is a fifth included angle θ5 between the third inclined surface 1701 and the bottom surface 112 of the light guide plate 11, there is a sixth included angle θ6 between the fourth inclined surface 1702 and the bottom surface 112 of the light guide plate 11, and the fifth included angle θ5 is smaller than the sixth included angle θ6. In the embodiment, the fifth included angle θ5 is, for example, greater than or equal to 19 degrees and less than or equal to 21 degrees, and the sixth included angle θ6 is, for example, equal to 74 degrees, to which the invention is not limited. The first microstructures 17 are adapted to destroy the total reflection of the beam L in the light guide plate 11 to allow the beam L to be emitted from the light emitting surface 111 of the light guide plate 11, and the reflective sheet 16 is adapted to reflect a portion of the beam L passing through the bottom surface 112 of the light guide plate 11 to allow the beam L to be transmitted toward the light guide plate 11.

As shown in FIG. 1, when the beam L emitted from the light source 12 enters the light guide plate 11 through the light incident surface 113 of the light guide plate 11, the beam L is guided to the light emitting surface 111 of the light guide plate 11 by the first microstructures 17 disposed on the bottom surface 112 of the light guide plate 11. The beam L is emitted from the light emitting surface 111 of the light guide plate 11 to form an emitting beam L' transmitted toward the first prism sheet 13. Since each first microstructure 17 has the fifth included angle θ5 greater than or equal to 19 degrees and less than or equal to 21 degrees between the third inclined surface 1701 and the bottom surface 112 and the sixth included angle θ6 equal to 74 degrees between the fourth inclined surface 1702 and the bottom surface 112, the beam L can be adjusted to the emitting beam L' with a specific emitting angle. The emitting beam L' with the specific emitting angle is emitted from the light emitting surface 111 of the light guide plate 11 and transmitted to the first prism sheet 13, successfully passing through the first prism sheet 13 and utilized by the first prism sheet 13 without being reflected by the first prism units 130 of the first prism sheet 13, thereby effectively increasing the light emitting rate of the emitting beam L' emitted from the first prism sheet 13, solving the conventional problem of light energy attenuation caused by the light reflected back and forth between the prism sheet and the reflective sheet, and improving the luminance. Specifically, there is a third included angle θ3 between the emitting beam L' with the specific angle and the normal line N of the light emitting surface 111 of the light guide plate 11, and the third included angle θ3 is, for example, greater than or equal to 80 degrees and less than or equal to 90 degrees, to which the invention is not limited. Further, when the emitting beam L' passes through the first prism sheet 13, the first prism units 130 of the first prism sheet 13 are adapted to refract the emitting beam L' to form a deflected beam L" transmitted toward the second prism sheet 14 and the third prism sheet 15. Since there is a first included angle θ1 greater than or equal to 9 degrees and less than or equal to 25 degrees between the first inclined surface 1301 of each first prism unit 130 and the top surface 132 of the first substrate 131 and there is a second included angle θ2 greater than or equal to 9 degrees and less than or equal to 25 degrees between the second inclined surface 1302 and the top surface 132 of the first substrate 131, the emitting beam L' can be adjusted to the deflected beam L" with a specific angle. Specifically, there is a fourth included angle θ4 between the above-mentioned deflected beam L" with the specific angle and the normal line N of the light emitting surface 111 of the light guide plate 11, and the fourth included angle θ4 is, for example, equal to 40 degrees, to which the invention is not limited. Then, when the deflected beam L" with the specific angle passes through the second prism sheet 14 and the third prism sheet 15, the deflected beam L" is adjusted to a normal emitting beam (i.e., the z-axis direction) by the second prism units 140 of the second prism sheet 14 and the third prism units 150 of the third prism sheet 15. The above-mentioned normal emitting beam (i.e., the deflected beam L") overlaps the normal line N of the light emitting surface 111 of the light guide plate 11. Using the first prism units 130 of the first prism sheet 13 and the first microstructures 17 disposed on the bottom surface 112 of the light guide plate 11 to adjust the beam emitted from the light guide plate 11 to a specific angle and then transmitting the adjusted beam to the second prism sheet 14 and the third prism sheet 15 sequentially can effectively increase the amount of light of the light source module 1 and thus increase the luminance of the light source module 1. In addition, the vertical viewing angle (the viewing angle in the y-axis direction) of the light source module 1 can be adjusted toward the position close to the center (i.e., the center of the light emitting surface 111 of the light guide plate 11).

It is worth mentioning that, designing the first included angle θ1 between the first inclined surface 1301 of each first prism unit 130 of the first prism sheet 13 and the top surface 132 of the first substrate 131 to be greater than or equal to 9 degrees and less than or equal to 25 degrees and designing the second included angle θ2 between the second inclined surface 1302 of each first prism unit 130 and the top surface 132 of the first substrate 131 to be greater than or equal to 9 degrees and less than or equal to 25 degrees is only one of the embodiments of the invention. In other embodiments, the first included angle θ1 between the first inclined surface 1301 of each first prism unit 130 and the top surface 132 of the first substrate 131 can be designed to be greater than or equal to 15 degrees and less than or equal to 23 degrees, and the second included angle θ2 between the second inclined surface 1302 of each first prism unit 130 and the top surface 132 of the first substrate 131 can be designed to be greater than or equal to 15 degrees and less than or equal to 23 degrees. Referring to FIG. 3. FIG. 3 is a schematic view of the relation of the first included angle θ1 between the first inclined surface 1301 and the top surface 132 and the second included angle θ2 between the second inclined surface 1302 and the top surface 132 to the luminance. As shown in FIG. 3, when the first included angle θ1 and the second included angle θ2 are greater than or equal to 9 degrees and less than or equal to 25 degrees, the minimum luminance 9855.3 cd/m$^2$ of the light source module 1 is still much higher than the luminance 8837.5 cd/m$^2$ of the light source module without the first prism sheet 13. When the first included angle θ1 and the second included angle θ2 are greater than or equal to 15 degrees and less than or equal to 23 degrees, the luminance of the light source module 1 can be up to about 12560.5 cd/m$^2$. In addition, when the first included angle θ1 and the second included angle θ2 are equal to 5 degrees, the luminance 8559.6 cd/m$^2$ of the light source module 1 is lower than the luminance 8837.5 cd/m$^2$ of the light source module without the first prism sheet 13. When the first included angle θ1 and the second included angle θ2 are equal to 30 degrees, the luminance 7687.0 cd/m$^2$ of the light source module 1 is lower than the luminance 8837.5 cd/m$^2$ of the light source module without the first prism sheet 13.

According to the above description, it is known that when the first included angle θ1 or the second included angle θ2 is less than 9 degrees, the vertical viewing angle of the light source module 1 cannot be adjusted toward the position close to the center, the luminance of the light source module 1 is significantly reduced, and the effect of luminance gain is not ideal. Similarly, when the first included angle θ1 or the second included angle θ2 is greater than 25 degrees, in addition the vertical viewing angle of the light source module 1 is significantly deviated from the position of the center, the emitting beam L' emitted from the light emitting surface 111 of the light guide plate 11 also cannot be utilized by the first prism sheet 13 (cannot effectively refract the emitting beam L' to the above-mentioned specific angle), which may lead to a significant decrease in the effect of the luminance gain of the light source module 1. Thus, in the embodiment, the first included angle θ1 between the first inclined surface 1301 of each first prism unit 130 of the first prism sheet 13 and the top surface 132 of the first substrate 131 is designed to be greater than or equal to 9 degrees and less than or equal to 25 degrees, and the second included angle θ2 between the second inclined surface 1302 of each first prism unit 130 and the top surface 132 of the first substrate 131 is designed to be greater than or equal to 9 degrees and less than or equal to 25 degrees; as a result, the vertical viewing angle of the light source module 1 is located at the position close to the center and a better effect of luminance gain is obtained by the design of the first included angle θ1 and the second included angle θ2 mentioned above.

As shown in FIG. 1 and FIG. 2, it is worth mentioning that each second prism unit 140 of the second prism sheet 14 and each third prism unit 150 of the third prism sheet 15 of the embodiment are, for example, a strip structure with a triangular cross section. Thus, each second prism unit 140 has a first vertex angle θ7 away from the second substrate 141, and each third prism unit 150 has a second vertex angle θ8 away from the third substrate 151. In the embodiment, the first vertex angle θ7 is, for example, greater than or equal to 80 degrees and less than or equal to 95 degrees, and the second vertex angle θ8 is, for example, greater than or equal to 80 degrees and less than or equal to 95 degrees, to which the invention is not limited. Referring to FIG. 4. FIG. 4 is a schematic view of the relation of the first vertex angle θ7 of each second prism unit 140 and the second vertex angle θ8 of each third prism unit 150 to the luminance. As shown in FIG. 4, when the first vertex angle θ7 and the second vertex angle θ8 are greater than or equal to 80 degrees and less than or equal to 95 degrees and the first included angle θ1 and the second included angle θ2 of the first prism sheet 13 are equal to 20 degrees, the minimum luminance 10410.1 cd/m$^2$ of the light source module 1 is still much higher than the luminance 8837.5 cd/m$^2$ of the light source module without the first prism sheet 13. Thus, the vertical viewing angle of the light source module 1 is located at the position close to the position of the center and a better effect of luminance gain is obtained by the design of the first vertex angle θ7 and the second vertex angle θ8 mentioned above.

Figure 5:
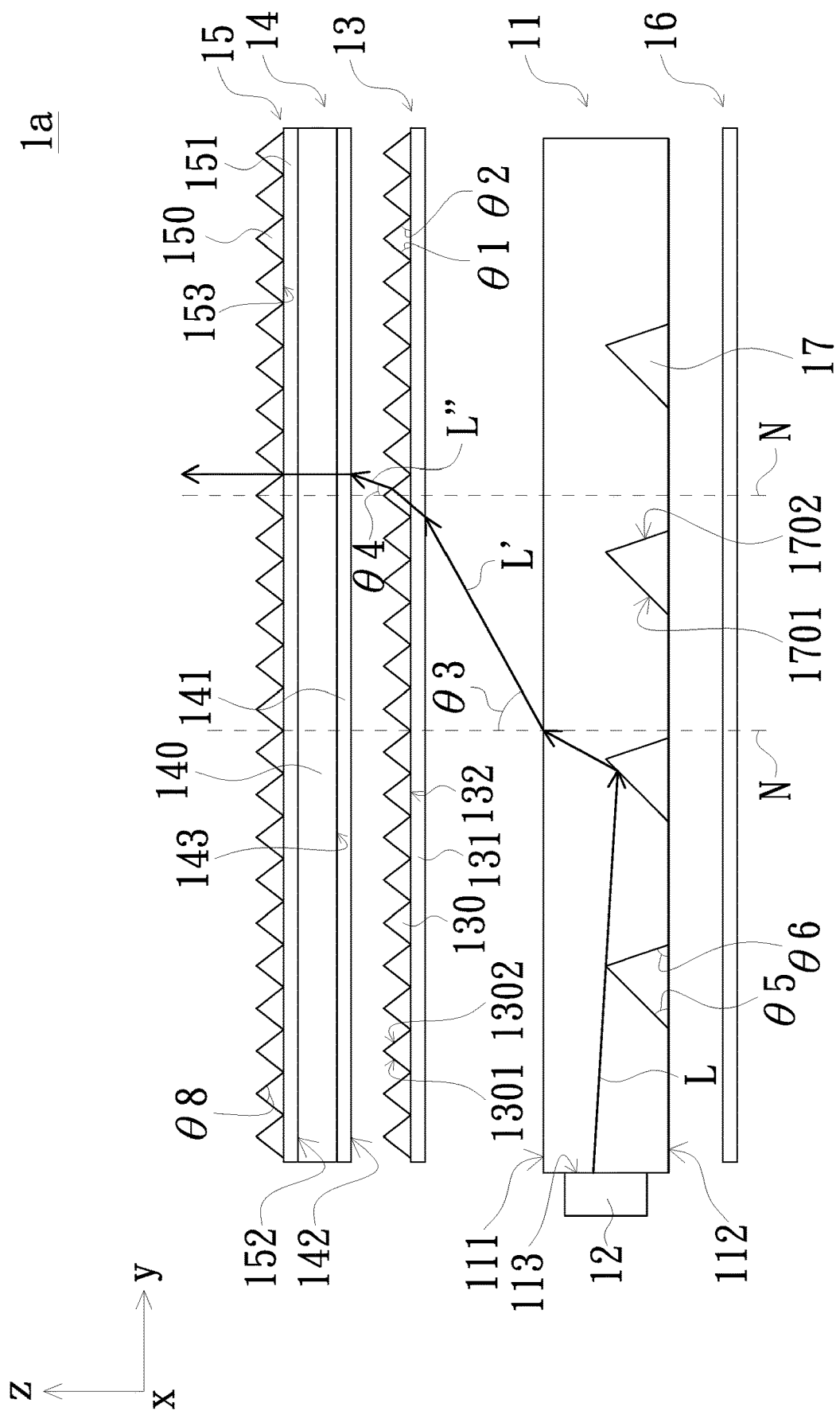
FIG. 5 is a schematic side view of a light source module according to another embodiment of the invention.

Referring to FIG. 5. FIG. 5 is a schematic side view of a light source module according to another embodiment of the invention. As shown in FIG. 5, the light source module 1a of the embodiment is similar to the light source module 1 shown in FIG. 1 and FIG. 2. The difference is that the second prism units 140 of the second prism sheet 14 of the light source module 1a of the embodiment contact the third surface 152 of the third substrate 151 of the third prism sheet 15. In this structural design, the overall thickness of the light source module 1a can be reduced and the vertical viewing angle of the light source module 1a also can be adjusted, thereby further increasing the amount of light and improving the luminance of the light source module 1a.

Figure 6:
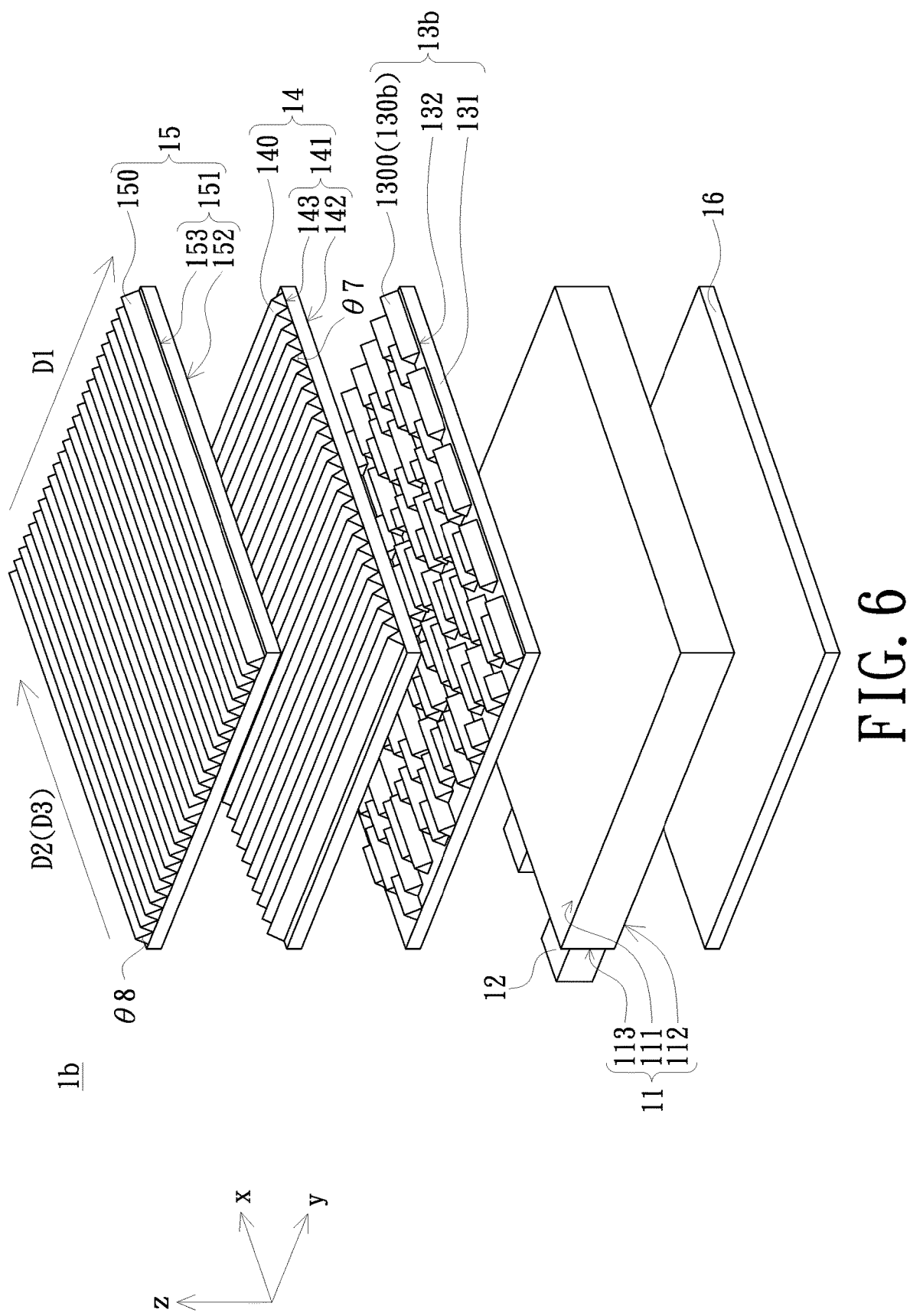
FIG. 6 is a schematic perspective structural view of a light source module according to another embodiment of the invention.

Referring to FIG. 6. FIG. 6 is a schematic perspective structural view of a light source module according to another embodiment of the invention. As shown in FIG. 6, the light source module 1b of the embodiment is similar to the light source module 1 shown in FIG. 1 and FIG. 2. The difference is that each first prism unit 130b of the first prism sheet 13b of the embodiment includes a plurality of discontinuous sections 1300, and the sections 1300 are distributed along the third direction D3 (i.e., the x-axis direction). In other words, the sections 1300 of the first prism units 130b are arranged in an array. In this structural design, the vertical viewing angle of the light source module 1b also can be adjusted, thereby further increasing the amount of light and improving the luminance of the light source module 1b.

Figure 7:
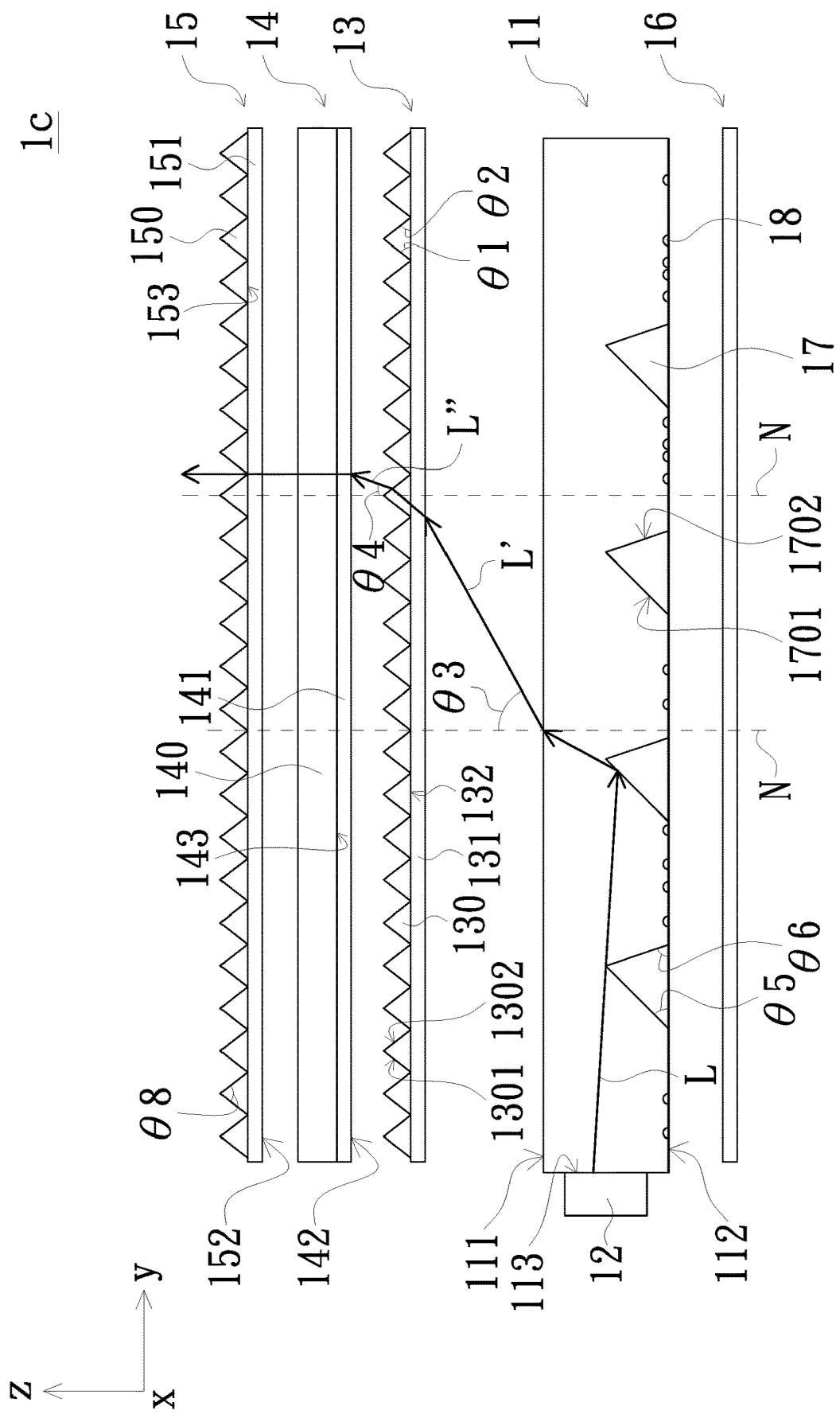
FIG. 7 is a schematic side view of a light source module according to another embodiment of the invention.

Referring to FIG. 7. FIG. 7 is a schematic side view of a light source module according to another embodiment of the invention. As shown in FIG. 7, the light source module 1c of the embodiment is similar to the light source module 1 shown in FIG. 1 and FIG. 2. The difference is that the light guide plate 11 of the light source module 1c of the embodiment further includes a plurality of second microstructures 18. The second microstructures 18 are disposed on the bottom surface 112 of the light guide plate 11. The second microstructures 18 are adjacent to the first microstructures 17, and the surface of each second microstructure 18 is, for example, an arcuate surface, to which the invention is not limited. In the embodiment, the second microstructures 18 are, for example, recessed into the bottom surface 112 of the light guide plate 11 in a direction toward the light emitting surface 111, to which the invention is not limited. In other embodiments, the second microstructures 18 protrude, for example, from the bottom surface 112 of the light guide plate 11 in a direction toward to the reflective sheet 16. In the embodiment, the second microstructures 18 are, for example, laser dots or other forms of dots. In this structural design, the vertical viewing angle of the light source module 1c also can be adjusted, thereby further increasing the amount of light and improving the luminance of the light source module 1c. In addition, in other embodiments, the light guide plate of the light source module may have only the second microstructure 18 and without the first microstructure 17, and the aforementioned effect also can be achieved.

Figure 8A:
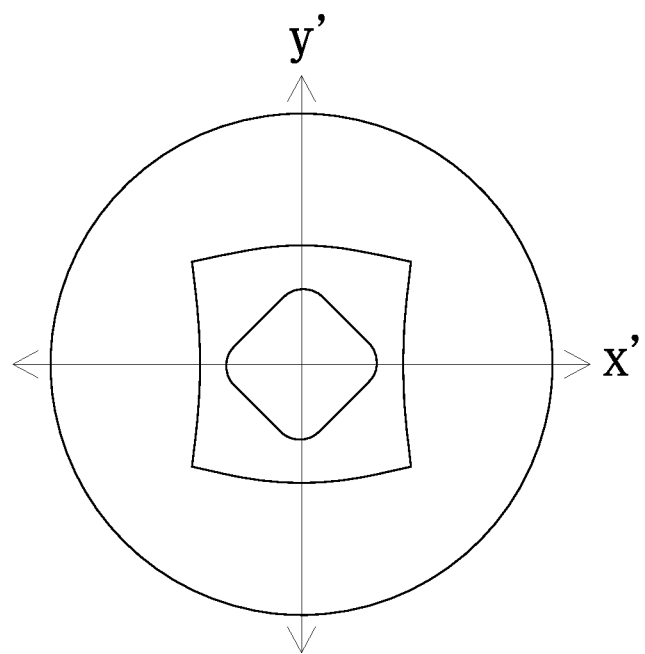
FIG. 8A is a viewing angle view of a conventional light source module.
Figure 8B:
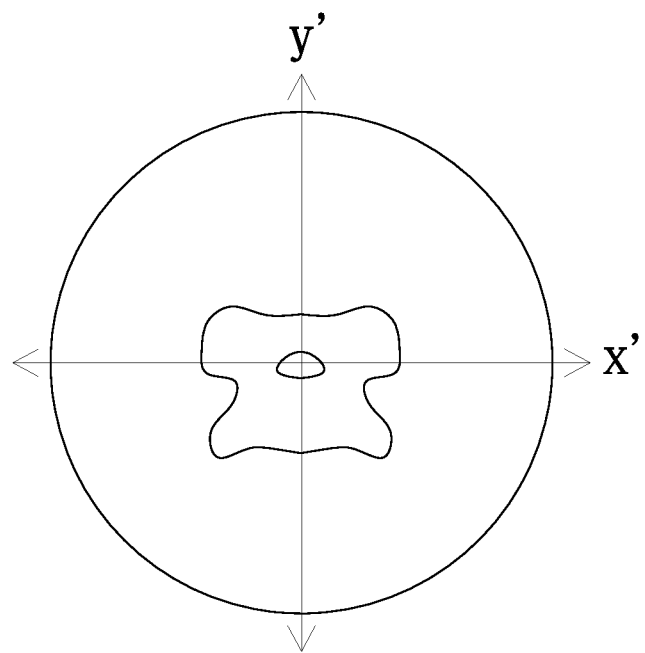
FIG. 8B is a viewing angle view of a light source module according to the embodiment of the invention.

Referring to FIG. 8A and FIG. 8B. FIG. 8A is a viewing angle view of a conventional light source module. FIG. 8B is a viewing angle view of a light source module according to an embodiment of the invention. According to the viewing angle view shown in FIG. 8A, it is known that the vertical viewing angle (i.e., the viewing angle in the y'-axis direction) of the conventional light source module is diffused, that is, the vertical viewing angle cannot be concentrated at the position of the center (i.e., the intersection of the x'-axis direction and the y'-axis direction), so that the user needs to be adjusted to the position away from the center of the light emitting surface to view the beam of the conventional light source module. According to the viewing angle view shown in FIG. 8B, it is known that the light source modules 1 to 1c of the embodiments of the invention adjust the deflection angles of the beams by the first prism units 130 and 130b of the first prism sheets 13 and 13b, and thereby adjusting the vertical viewing angles (i.e., the viewing angle in the y'-axis direction) of the light source modules 1 to 1c to be concentrated toward the position of the center (i.e., the intersection of the x'-axis direction and the y'-axis direction, that is, the center of the light emitting surface 111), so that the user can view the beam of the light source module at the position of the center of the light emitting surface.

It is to be noted that the first prism sheet according to the embodiment of the invention is not limited to the structures of the light source modules shown in FIG. 1 to FIG. 7. The first prism sheet of the embodiment of the invention can be widely used in a variety of the light source modules with different structures, and all can achieve the effects of adjusting the vertical viewing angle of the light source module, increasing the amount of light and improving the luminance of the light source module. For example, in other embodiments, the extending direction of the second prism units 140 of the second prism sheet 14 along the first direction D1 is, for example, located between the x-axis and the y-axis (i.e., not perpendicular to the light incident surface 113), and the extending direction of the third prism units 150 of the third prism sheet 15 along the second direction D2 is perpendicular to the first direction D1 and is also located between the x-axis and the y-axis (i.e., not parallel to the light incident surface 113).

In summary, the light source module and the prism sheet of the embodiments of the invention have at least one of the following advantages. In the light source module according to the embodiment of the invention, the first prism sheet, the second prism sheet and the third prism sheet are sequentially disposed above the light guide plate from bottom to top, and the beam emitted from the light guide plate is adjusted by the first prism sheet to a specific angle and transmitted to the second prism sheet and the third prism sheet sequentially, and then the beam is adjusted to overlap the normal line of the light emitting surface of the light guide plate by the second prism sheet and the third prism sheet. Therefore, such a structural design can adjust the vertical viewing angle of the light source module, increase the amount of light and thus improve the luminance of the light source module. In addition, the first prism sheet of the embodiment of the invention has a plurality of specially designed prism units, so that the beam emitted from the light guide plate can be adjusted to the specific angle.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism sheet, the second prism sheet, the third prism sheet, the first microstructures, the second microstructures, the first prism units, the second prism units, the third prism units, the first substrate, the second substrate, the third substrate, the first surface, the second surface, the third surface, the fourth surface, the first inclined surface, the second inclined surface, the third inclined surface, the fourth inclined surface, the first direction, the second direction, the third direction, the first included angle, the second included angle, the third included angle, the fourth included angle, the fifth included angle, the sixth included angle, the first vertex angle and the second vertex angle are only used for distinguishing various elements and do not limit the number of the elements.

What is claimed is:

1. A light source module, comprising:
   a light guide plate, comprising a light emitting surface, a bottom surface opposite to the light emitting surface, and a light incident surface connected to the light emitting surface and the bottom surface;
   a light source, disposed on the light incident surface of the light guide plate, wherein the light source is adapted to emit a beam into the light guide plate through a transmission of the light incident surface;
   a first prism sheet, disposed on the light emitting surface of the light guide plate, wherein the first prism sheet comprises a plurality of first prism units, and the plurality of first prism units face a direction away from the light emitting surface;
   a second prism sheet, wherein the first prism sheet is located between the light emitting surface of the light guide plate and the second prism sheet, the second prism sheet comprises a plurality of second prism units extending in a first direction, and the plurality of second prism units face the direction away from the light emitting surface; and
   a third prism sheet, wherein the second prism sheet is located between the first prism sheet and the third prism sheet, the third prism sheet comprises a plurality of third prism units extending in a second direction, the plurality of third prism units face the direction away from the light emitting surface, and the second direction is perpendicular to the first direction,
   wherein the first prism sheet further comprises a first substrate, the first substrate has a top surface facing the second prism sheet, the plurality of first prism units are connected to the top surface, each of the plurality of first prism units comprises a first inclined surface close to the light source and a second inclined surface away from the light source, the first inclined surface is adjacent to and connects with the second inclined surface, there is a first included angle between the first inclined surface and the top surface, and there is a second included angle between the second inclined surface and the top surface.

2. The light source module according to claim 1, wherein the first included angle is $\theta 1$, and $9° \leq \theta 1 \leq 25°$.

3. The light source module according to claim 1, wherein the second included angle is $\theta 2$, and $9° \leq \theta 2 \leq 25°$.

4. The light source module according to claim 1, wherein the second prism sheet further comprises a second substrate, the second substrate has a first surface and a second surface opposite to the first surface, the first surface is opposite to the top surface of the first substrate, and the plurality of second prism units are disposed on the second surface.

5. The light source module according to claim 4, wherein the third prism sheet further comprises a third substrate, the third substrate has a third surface and a fourth surface opposite to the third surface, the third surface is opposite to the second surface of the second substrate, and the plurality of third prism units are disposed on the fourth surface.

6. The light source module according to claim 5, wherein the plurality of second prism units of the second prism sheet contact the third surface of the third substrate.

7. The light source module according to claim 1, wherein the plurality of first prism units of the first prism sheet extend in a third direction respectively, and the third direction is parallel to the light incident surface of the light guide plate.

8. The light source module according to claim 7, wherein each of the plurality of first prism units comprises a plurality of discontinuous sections, and the plurality of discontinuous sections are distributed along the third direction.

9. The light source module according to claim 1, wherein the beam is emitted from the light emitting surface to form an emitting beam transmitted toward the first prism sheet, there is a third included angle between the emitting beam and a normal line of the light emitting surface, the plurality of first prism units of the first prism sheet are adapted to refract the emitting beam to form a deflected beam transmitted toward the second prism sheet and the third prism sheet, there is a fourth included angle between the deflected beam and the normal line, the third included angle is θ3, the fourth included angle is θ4, 80°≤θ3≤90°, and θ4=49°.

10. The light source module according to claim 9, wherein the deflected beam overlaps the normal line of the light emitting surface after passing through the second prism sheet and the third prism sheet.

11. The light source module according to claim 1, further comprising a reflective sheet disposed on the bottom surface of the light guide plate, wherein the light guide plate is located between the reflective sheet and the first prism sheet, and the reflective sheet is adapted to reflect a portion of the beam passing through the bottom surface to form a reflected beam transmitted toward the light guide plate.

12. The light source module according to claim 1, wherein the light guide plate further comprises a plurality of first microstructures disposed on the bottom surface, each of the plurality of first microstructures comprises a third inclined surface and a fourth inclined surface, the third inclined surface is adjacent to and connects with the fourth inclined surface, there is a fifth included angle between the third inclined surface and the bottom surface, there is a sixth included angle between the fourth inclined surface and the bottom surface, and the fifth included angle is smaller than the sixth included angle.

13. The light source module according to claim 12, wherein the light guide plate further comprises a plurality of second microstructures disposed on the bottom surface and adjacent to the plurality of first microstructures, and each of the plurality of second microstructures has an arcuate surface.

14. A prism sheet adapted to be disposed on a light guide plate, comprising:
a substrate, having a top surface facing a direction away from the light guide plate; and
a plurality of prism units, connected to the top surface of the substrate, wherein the plurality of prism units face the direction away from the light guide plate, each of the plurality of prism units comprises a first inclined surface and a second inclined surface, the first inclined surface is adjacent to and connects with the second inclined surface, there is a first included angle between the first inclined surface and the top surface, there is a second included angle between the second inclined surface and the top surface, the first included angle is θ1, and 9°≤θ1≤25°.

15. The prism sheet according to claim 14, wherein the second included angle is θ2, and 9°≤θ2≤25°.

* * * * *